United States Patent
Kimberlin et al.

(10) Patent No.: US 6,814,549 B2
(45) Date of Patent: Nov. 9, 2004

(54) LINER FOR FLUID PUMP MOTOR

(75) Inventors: Robert R. Kimberlin, Murfreesboro, TN (US); Robert E. Harvey, III, Nashville, TN (US)

(73) Assignee: Standex International Corp., Salem, NH (US)

( * ) Notice: Subject to any disclaimer, the term of this patent is extended or adjusted under 35 U.S.C. 154(b) by 0 days.

(21) Appl. No.: 10/286,084

(22) Filed: Nov. 1, 2002

(65) Prior Publication Data

US 2003/0161740 A1 Aug. 28, 2003

Related U.S. Application Data

(60) Provisional application No. 60/360,693, filed on Feb. 28, 2002.

(51) Int. Cl.[7] .............................................. F04B 17/00
(52) U.S. Cl. ........................................ 417/357; 310/90
(58) Field of Search .................. 417/365, 366, 417/368, 410.1, 410.3, 410.4, 423.1, 423.11; 318/85, 86, 87, 88; 419/142, 152, 156, 179, 220, 252; 29/888, 888.02, 889.061; 310/90

(56) References Cited

U.S. PATENT DOCUMENTS

| | | | |
|---|---|---|---|
| 2,353,774 A | * | 7/1944 | Wagner ........................ 29/282 |
| 2,518,597 A | | 8/1950 | Brooks |
| 2,649,048 A | * | 8/1953 | Pezzillo et al. ............. 417/357 |
| 2,906,208 A | | 9/1959 | White |
| 3,031,973 A | * | 5/1962 | Kramer ....................... 417/357 |
| 3,067,690 A | | 12/1962 | Herr et al. |
| 3,288,073 A | | 11/1966 | Pezzillo |
| 3,487,457 A | | 12/1969 | Drouard et al. |
| 3,911,300 A | | 10/1975 | Lebkuchner |
| 4,065,231 A | | 12/1977 | Litzenberg |
| 4,115,038 A | * | 9/1978 | Litzenberg ................. 417/357 |
| 4,118,644 A | | 10/1978 | Schulte et al. |
| 4,234,293 A | * | 11/1980 | Lightle ....................... 417/365 |
| 4,404,483 A | | 9/1983 | Lebkuchner |
| 5,009,578 A | | 4/1991 | Hyland |
| 5,642,991 A | | 7/1997 | Singleterry et al. |
| 5,763,973 A | | 6/1998 | Cramer |
| 5,919,033 A | | 7/1999 | Singleterry et al. |
| 6,068,456 A | * | 5/2000 | Tuckey et al. ............ 417/423.3 |
| 6,394,776 B2 | * | 5/2002 | Boldenow ..................... 418/69 |

FOREIGN PATENT DOCUMENTS

| | | |
|---|---|---|
| DE | 11 46 580 | 4/1963 |
| DE | 44 35 511 | 2/1996 |
| DE | 100 07 787 | 8/2000 |
| DE | 199 48 972 | 4/2001 |
| EP | 0 711 019 | 5/1998 |
| EP | 1 035 328 | 9/2000 |
| GB | 909 550 | 10/1962 |
| GB | 1 358 135 | 6/1974 |
| GB | 2 239 987 | 7/1991 |
| JP | 60026429 A2 | 2/1985 |
| JP | 6088593 A2 | 3/1994 |
| WO | WO 99 14503 | 3/1999 |
| WO | WO 01 29394 | 4/2001 |

* cited by examiner

*Primary Examiner*—Justine R. Yu
(74) *Attorney, Agent, or Firm*—Luedeka, Neely & Graham, P.C.

(57) ABSTRACT

An apparatus for protecting a fluid pump motor includes an electric motor for driving a pump head to pressurize a fluid. A liner is positioned in the motor air gap to prevent pressurized fluid from contacting one or more magnetic field producing elements of the stator. The liner includes a thin wall to minimize the air gap distance. The liner wall is made thin enough that, under loading of the pressurized fluid, the liner wall deforms and bears against one or more of the field producing elements of the stator for structural support. The liner is preferably fabricated as a single metal part using a deep drawing process that results in a can having opposed open and closed ends with a substantially uniform cross-section between the open and closed ends of the can.

22 Claims, 14 Drawing Sheets

LINER FOR FLUID PUMP MOTOR

This nonprovisional application claims priority to provisional application Ser. No. 60/360,693 filed Feb. 28, 2002, and entitled "Canned Motor Pump."

FIELD OF THE INVENTION

The present invention relates generally to fluid pumps. More particularly, the present invention relates to a fluid pump with a single sensor configured to detect an overheat condition in either the pump head or the motor driving the pump head.

BACKGROUND OF THE INVENTION

Fluid pumps with integral motors, such as so-called "canned" pumps, are generally employed in a variety of applications. For example, fluid motor pumps are often used to move potable fluids, such as water, in beverage dispensing machines. Motors employed in such pumps are often run "wet" in that the pumped fluid circulates through the motor. To protect the motor stator windings from the fluid, a barrier can or liner is positioned in the motor air gap. Unfortunately, the barrier can has the undesirable effect of increasing the motor air gap with a corresponding reduction in motor performance. Depending on the type of pump, the barrier can be subjected to rather high fluid pressures. To maintain the barrier can's structural integrity, the can is configured to have relatively thick walls which can withstand the forces exerted by the pressurized fluid with little or no deformation of the can. In order to maintain proper running clearances, the motor air gap must be increased in direct proportion to the can wall thickness. To accommodate the increase in air gap, the motor must typically be upsized to keep motor performance at a desired level.

What is needed, therefore, is a barrier can for a canned motor pump that reduces the motor air gap of prior art canned motor pumps.

SUMMARY OF THE INVENTION

The present invention achieves its objectives by providing an apparatus for protecting a fluid pump motor. The apparatus includes an electric motor for driving a pump head, such as a rotary vane pump head, to pressurize a fluid. The electric motor includes a stator with one or more magnetic field producing elements for producing a magnetic field in response to a flow of electrical current through the one or more magnetic field producing elements, and a rotor having a rotor shaft for driving the pump head in response to the magnetic field produced by the stator. A motor air gap defined between the stator and the rotor receives pressurized fluid from the pump head. A liner is positioned in the air gap to inhibit pressurized fluid entering the air gap from contacting the one or more magnetic field producing elements of the stator. The liner has a thin liner wall that deforms during operation of the apparatus to bear against the one or more magnetic field producing elements of the stator for structural support as a result of loading imparted by the pressurized fluid on the liner wall.

In a preferred embodiment, the electric motor includes and end cap for closing one end of the motor. In this embodiment, the liner wall may include a portion that deforms to bear against the end cap for structural support as a result of loading by the pressurized fluid.

The liner may be fabricated as a single metal part using a deep drawing process to produce a liner with opposed open and closed ends with a substantially uniform cross-section between the open and closed ends.

To protect the rotor laminations from pressurized fluid entering the motor air gap, the rotor may be include a rotor barrier can which seals the rotor laminations from the fluid.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

Figure 1:
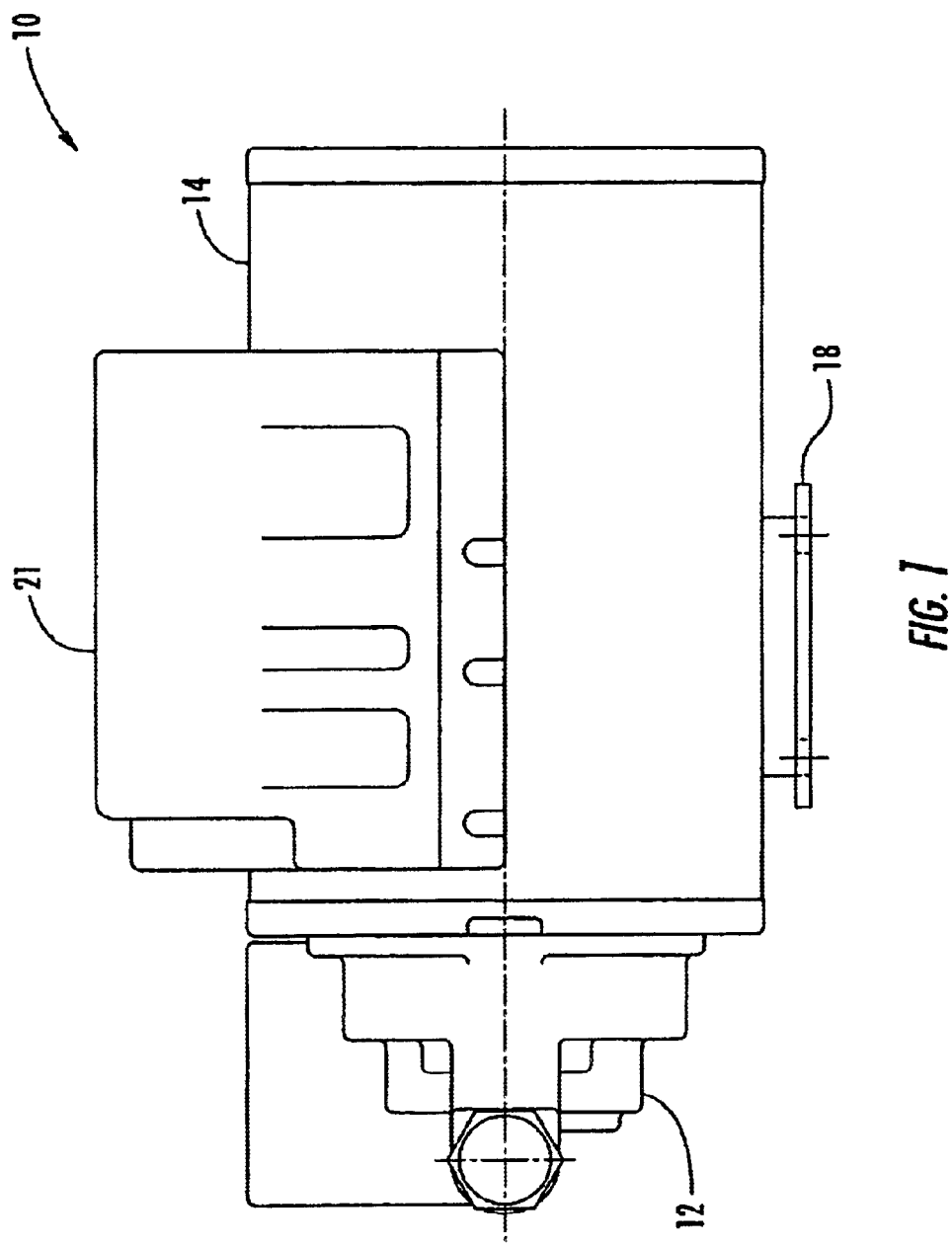
FIG. 1 is a side view of a canned motor pump according to the present invention.

Preferred embodiments of the present invention will now be described with reference to the accompanying drawings, wherein like reference characters designate like or similar parts throughout. The terminology used herein is intended to be interpreted in its broadest reasonable manner, even though it is being utilized in conjunction with a detailed description of certain specific preferred embodiments of the present invention. This is further emphasized below with respect to some particular terms used herein. Any terminology intended to be interpreted by the reader in any restricted manner will be overtly and specifically defined as such in this specification.

Figure 2:
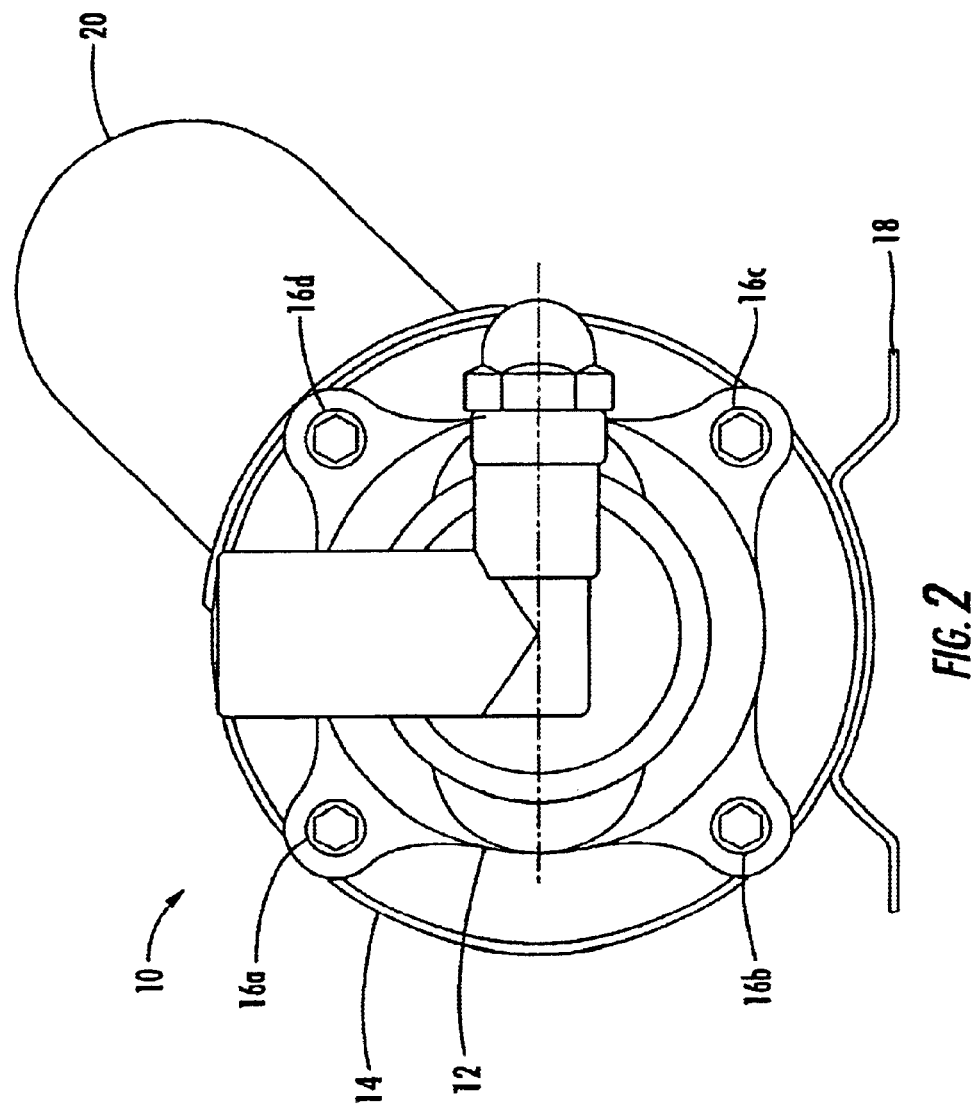
FIG. 2 is an end view of the pump head for the canned motor pump of FIG. 1.

FIGS. 1 and 2 illustrate, respectively, side and end views of a canned motor pump 10 according to a preferred embodiment of the invention. The pump 10 includes a pump head housing 12 which houses internal components of the pump attached to a motor housing 14 for housing electric motor components. The pump head housing 12, which functions to receive a fluid at a first pressure and output the fluid at a second pressure greater than the first pressure, is attached to the motor housing 14 as by bolts 16a–d or other suitable attachment or fastening devices. A mounting bracket 18 is attached to the motor housing 14 to facilitate installation of the motor pump 10. The electric motor contained in motor housing 14 operates to drive pump head components contained in the pump head housing 12 to produce flow and pressure of a pumped fluid, such as potable water for use in beverage machines. Although other types of motors may be used in the practice of the invention, the particular motor type illustrated in FIGS. 1 and 2 is a ½ horsepower, permanent split capacitor (PSC) motor with a capacitor housing 21.

Figure 3:
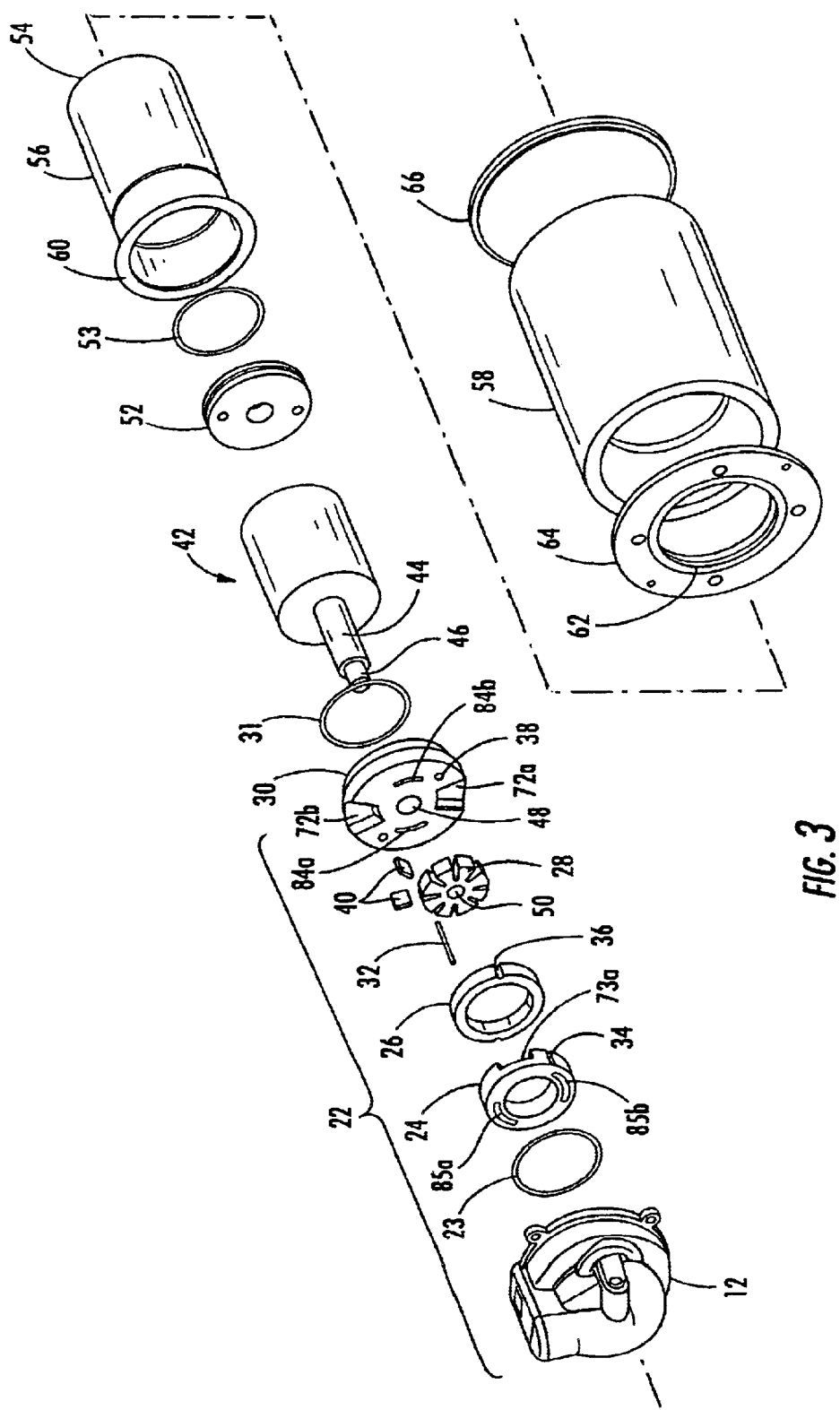
FIG. 3 is an exploded view of a canned motor pump with a rotary vane pump head according to the invention.

As shown in the exploded view of FIG. 3, the pump head 22 includes the pump head housing 12, front pump head O-ring 23, front bearing 24, cam ring 26, pump rotor 28 with sliding vanes 40, pin 32, and rear bearing 30. A total of eight (8) of the vanes 40 are preferably employed for the particular pump rotor 28 shown in FIG. 3. For purposes of clarity, only two (2) of the vanes 40 are depicted in FIG. 3. The front bearing 24, cam ring 26, and rear bearing 30 are preferably fabricated from a suitable material (such as carbon, silicon, graphite, polymer, glass, and steel), and these parts are preferably locked to one another by use of the pin 32 positioned in grooves 34, 36 provided in the outer surfaces of the front bearing 24 and the cam ring 26, respectively, and in a detent 38 formed in the rear bearing 30. The pump rotor 28 is preferably fabricated from stainless steel and includes a plurality of slots each of which contains a vane 40. A rear pump head O-ring 31 provides a seal between the pump head 22 and motor 14.

With continued reference to FIG. 3, a motor rotor 42 (preferably a canned rotor) includes a shaft 44 (preferably a hollow shaft) having a keyed end 46 which penetrates through openings 48, 50 formed in the rear bearing 30 and pump rotor 28, respectively. The pump rotor opening 50 is keyed to the rotor shaft 44 so that rotation of the rotor shaft 44 in response to a magnetic field produced by operation of the motor stator drives the pump head 22 by rotating the pump rotor 28 and its vanes 40. The distal end of the rotor shaft 44 is supported by motor bearing 52 which is attached to the closed end 54 of a stator barrier can 56. A motor bearing O-ring 53 is positioned between the motor bearing 52 and the inner surface of the stator barrier can 56. At least a portion of the stator barrier can 56 is positioned in the air gap of electric motor 58 and functions to protect one or more magnetic field producing elements of the stator (including the stator laminations and associate field windings) from contact with the pumped fluid. The stator barrier can 56 also preferably includes a flange 60 adjacent to the open end of the can 56 which is received by an annular seat 62 formed on one side of the front motor endshield 64. Preferably, a rear motor endshield 66, or end cap, is provided for closure of the rear portion of the motor 58.

Figure 6:
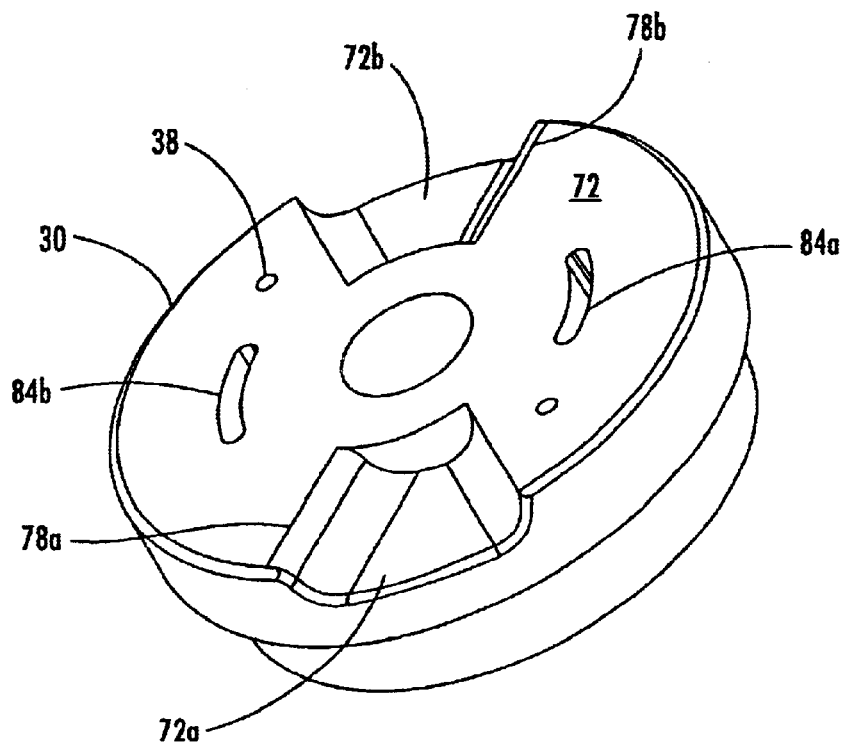
FIG. 6 is an isometric view of an end bearing according to the invention showing contoured inlet passages.
Figure 7:
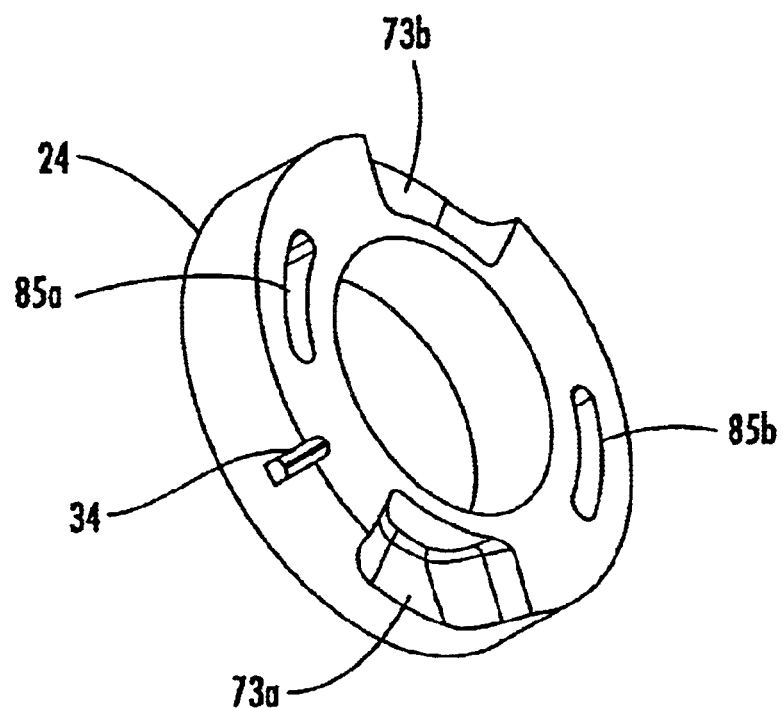
FIG. 7 is an isometric view of a front bearing according to the invention showing contoured fluid pockets.

With reference now to FIGS. 4–8, inlet fluid enters the pump head housing 12 at a low pressure inlet 20. The fluid moves from low pressure inlet 20 into an intake plenum chamber 70 defined by an annular space surrounding the cam ring 26 and bounded on one side by the pump head housing 12 with the other side bounded by a front surface 72 of the rear bearing 30. Opposed fluid intake channels 72a, 72b formed on the rear bearing front surface 72 provide flow channels for fluid to flow from the intake plenum chamber 70 to suction zones 74a, 74b of opposed fluid pumping chambers 76a, 76b formed between the pump rotor 28 and the cam ring 26. Fluid flowing from pockets 73a, 73b (FIG. 7) formed in the front bearing 24 flows into the suction zones 74a, 74b. The fluid intake channels 72a, 72b of the rear bearing 30 are illustrated in FIG. 6, and the fluid pockets 73a, 73b of the front bearing 24 are illustrated in FIG. 7. As can be seen in FIG. 6, upstream edges 78a, 78b of the fluid intake channels 72a, 72b are each preferably contoured to enhance flow characteristics, reduce noise, and reduce cavitation. As similarly shown in FIG. 7, upstream edges 79a, 79b of the pockets 73a, 73b formed in the front bearing 24 are also preferably contoured to enhance flow characteristics and to reduce noise and cavitation.

Referring again to FIG. 5, the pumping chambers 76a, 76b may be formed by making the pump rotor 28 substantially round and making the inner surface of the cam ring 26 substantially oval or oblong. Within the pumping chambers 76a, 76b, fluid is moved by the sweeping action of the vanes 40 through pumping zones 80a, 80b and then into pumping zones 82a, 82b. The increasing volume within the suction zones 74a, 74b functions to draw fluid by suction force from the intake plenum chamber 70 into the pumping chambers 76a, 76b. Likewise, the decreasing volume within the pumping zones 82a, 82b functions to force the flow out of the pumping zones 82a, 82b through opposed rear bearing discharge passages 84a, 84b and through front bearing discharge passages 85a, 85b.

Pressure loads generated in the pumping zones 82a, 82b exert forces generally in a radial direction on the pump rotor 28 and cam ring 26. Since the pumping zones 82a, 82b are in opposition to one another, pressure loads are transmitted substantially symmetrically to the pump rotor 28 and cam ring 26. This substantially even distribution of loads tends to balance the loads transmitted to the motor shaft 44, thereby reducing bearing loads acting upon the rear bearing 30. The load balancing also tends to inhibit separation of pump head parts. It has been observed that unbalanced loads transmitted to the rear bearing can require power levels 20–30% greater to deliver the same amount of pump output. Evenly distributing the loads generated in the pumping zones 82a, 82b also has the advantageous effect of centering the cam ring 26 within the pump head housing 12.

Figure 9:
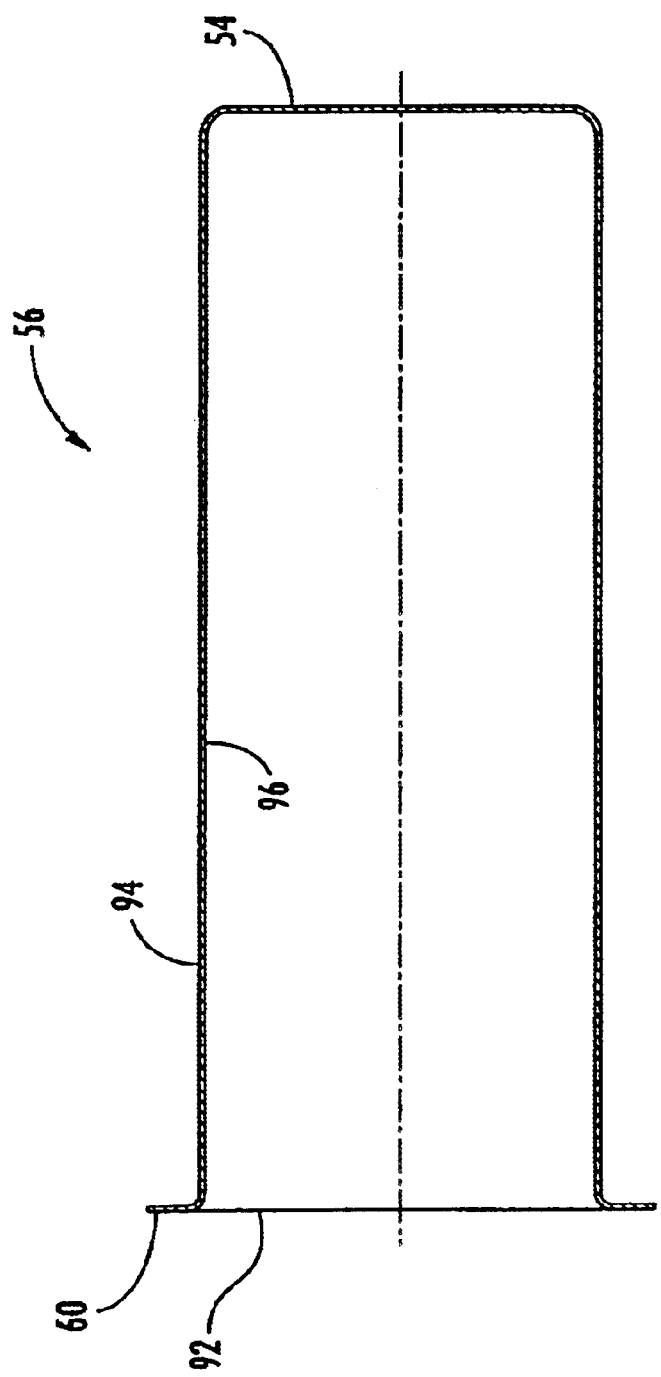
FIG. 9 is a cross-section view of a stator barrier can according to the invention.

Referring again to FIG. 4, pressurized fluid exits the pump head 22 through the rear bearing discharge passages 84a, 84b and enters that portion of the motor 14 commonly referred to as the air gap 88. The stator barrier can 56, or liner, provides a seal to prevent or inhibit pressurized fluid from contacting the stator laminations 90 and stator windings 91. The can 56 is defined by an open end 92 in opposed relation to a closed end 54 with a liner body between the open and closed ends. The open end 92 preferably includes an annular flange 60 which serves as the only point of attachment of the can 56 to the motor 14. Alternatively, the can 56 is secured to or within the motor 14 by other suitable structure. The stator barrier can 56, shown also in FIG. 9, is preferably fabricated as a single metal part using a deep drawing process which produces a liner body with a substantially uniform cross-section between its open and closed ends. So, in a preferred embodiment, the can 56 requires no welding. Alternatively, the can 56 is fabricated from two or more parts attached to one another, such as by welding.

In the interest of minimizing the air gap 88 to enhance motor performance, at least that portion of the can walls 94 which occupy the motor air gap 88 are preferably relatively thin. In a preferred embodiment, the can walls 94 are made to be substantially thin so that they deform when loaded by pressurized fluid. This tendency to deform is preferably opposed/supported by utilization of existing motor structure. In operation, additional structural support for that portion of the can walls 94 which occupy the air gap 88 is largely provided by the motor laminations 90. Additional structural support may also be provided by the rear motor endshield 66, or end cap, when the wall of closed end 54 is made thin enough to deform as a result of loading imparted by the pressurized fluid on the closed end 54.

For high pressure applications during which the pumped fluid can reach pressures of about 300 psi, the stator barrier can 56 is preferably made of stainless steel drawn to a wall thickness of about 0.015 inches. For lower operating pressures, the walls 94 of the can 56 can be made even thinner.

Figure 4:
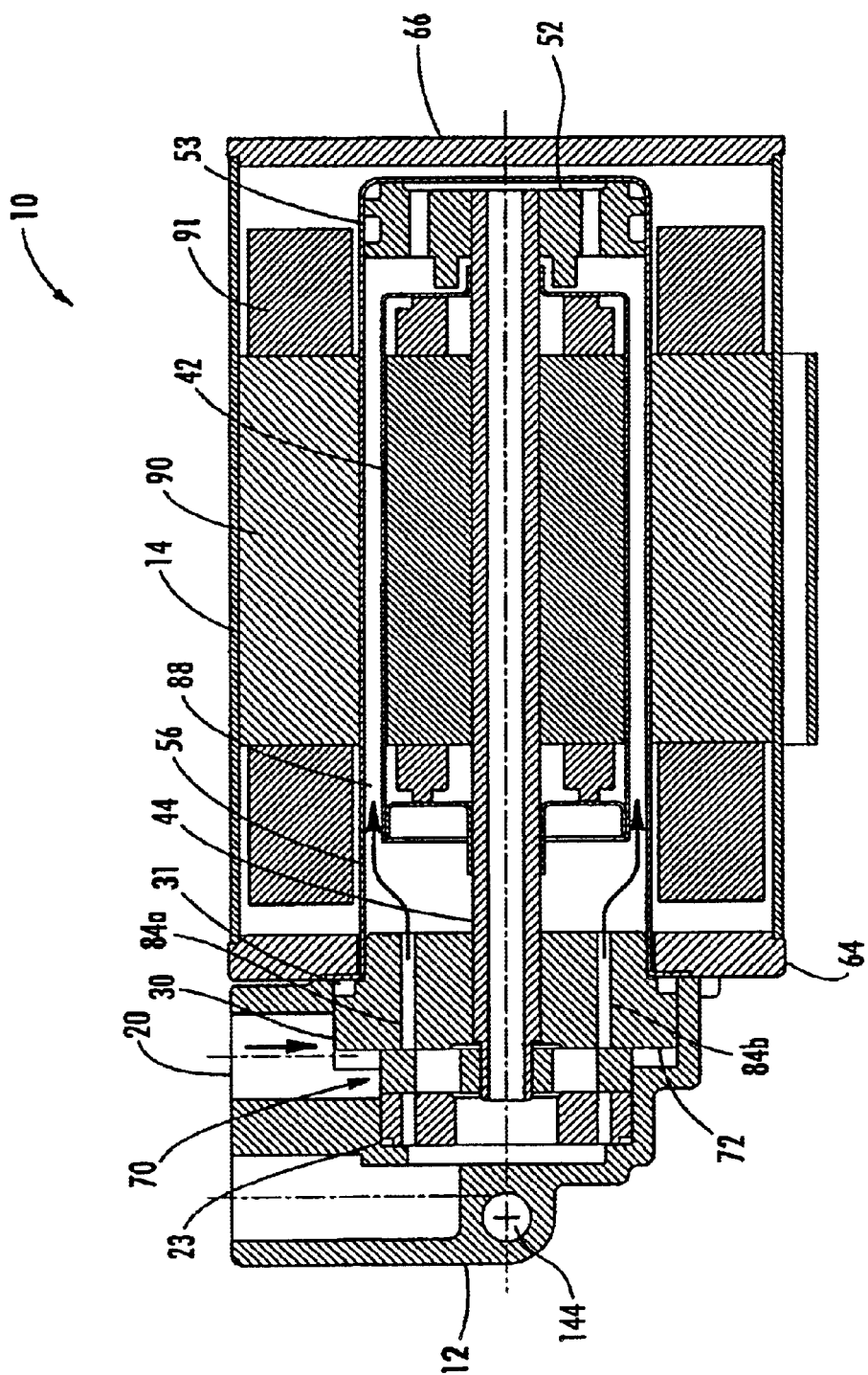
FIG. 4 is a cross-section view of a canned motor pump with a rotary vane pump head according to the invention with the pump in a low-pressure state.
Figure 5:
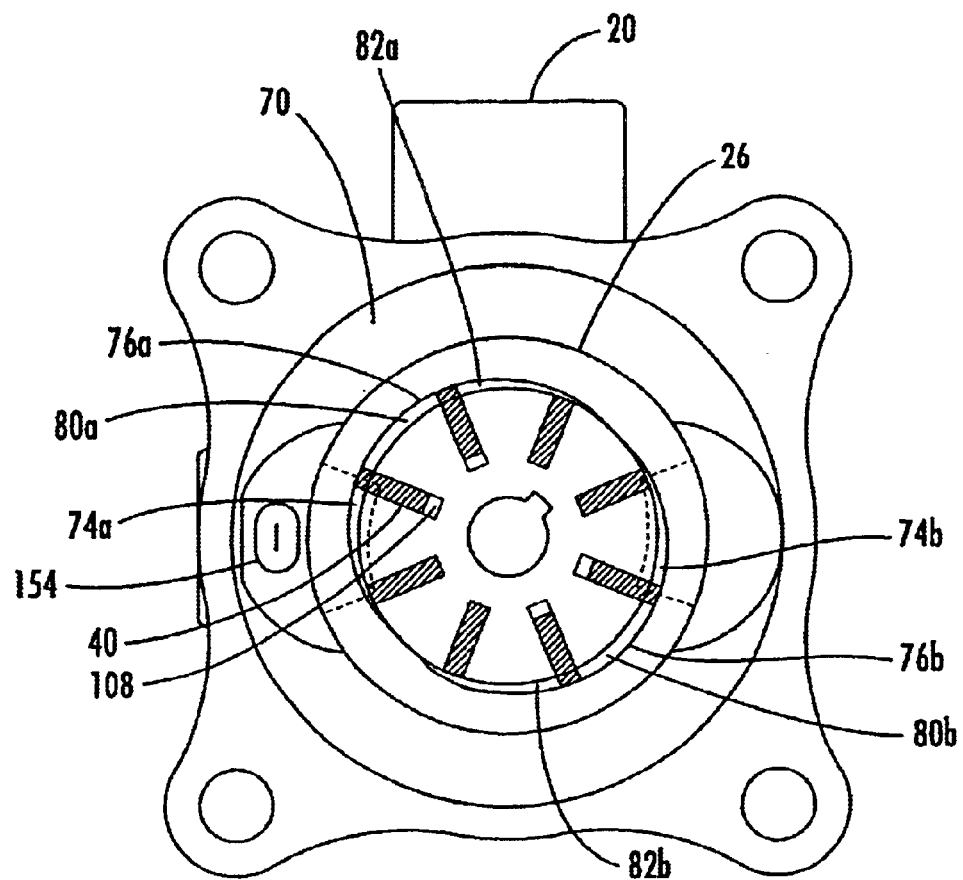
FIG. 5 is an open view of the rotary vane pump head of FIG. 4.
Figure 8:
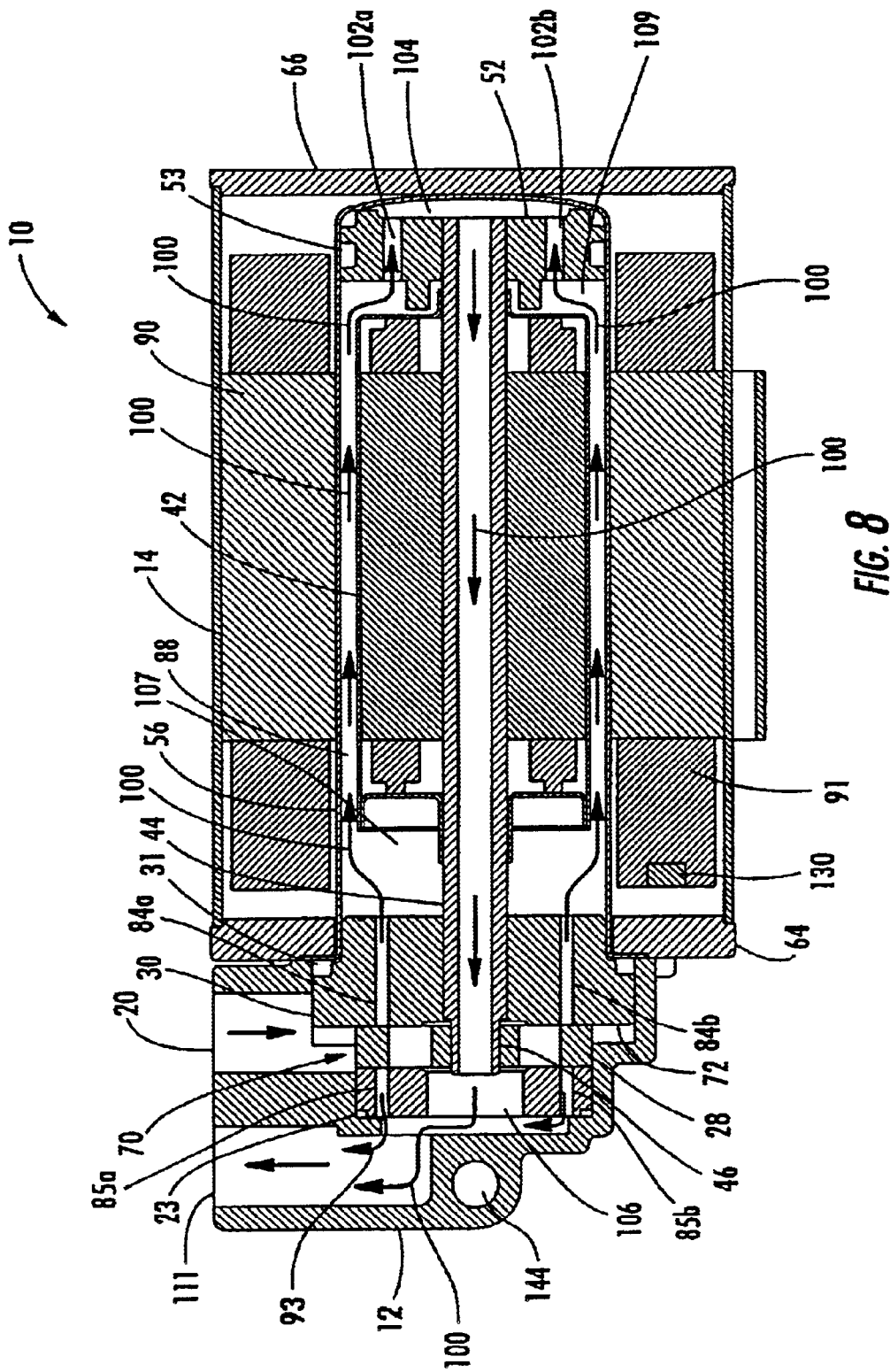
FIG. 8 is a cross-section view of a canned motor pump according to the invention with the pump in a high-pressure state.

In FIG. 4, the can 56 is shown in relaxed state with no internal fluid pressures acting upon the can 56. When loaded by sufficiently pressurized fluid acting upon inner surface 96 of the can 56, the can walls 94 will tend to deform and bear against the stator laminations 90 and, in a preferred embodiment, the rear motor endshield 66 as shown in FIG. 8. However, the endshield 66 does not have to carry the full load. Loads may also be carried by the flange 60 and its supporting front motor endshield 64 as well as the stator laminations 90.

The can 56 is preferably configured to have a small clearance fit between the can 56 and the stator laminations 90 for ease of assembly. The particular application of the pump 10 can be used to determine how much clearance should be provided. For example, in applications where the pumped fluid is to be used to remove heat from the motor 14, the clearance between the can 56 and stator laminations 90 should be sufficiently small so as to increase the amount of contact and thermal conductivity between the can 56 and the laminations 90. Conversely, for applications where it is desirable to thermally isolate the pumped fluid from the motor 14, the clearance between the can 56 and laminations 90 should be greater.

During fabrication of the can 56, it has been observed that the roundness of the can is somewhat difficult to control due to the stresses experienced in the material as the can 56 is formed. Thus, the middle portion of the can 56 is typically out-of-round. Typically, the can 56 has well controlled diameters at both ends. For applications where it is desirable to use the pumped fluid to remove heat from the motor 14, the resultant tight tolerances necessitate application of a moderate amount of force during insertion of the can 56 into the stator bore. As the can 56 is inserted into the stator bore, it will typically come to rest with one or more portions of the outer surface of the can 56 in contact with the stator laminations 90. As the pump 10 generates pressure, the can 56 expands/deforms and more fully contacts the motor laminations 90 and more fully conforms to the shape of the stator bore. Making the can 56 thin and expandable in this manner provides numerous advantages. First, since the can 56 is conformable, manufacturing imperfections in the can 56 are easily compensated. Second, the thinness of the can 56 minimizes the overall size of the motor air gap, which improves motor performance. Third, the can 56 is able to take advantage of existing motor structure to improve pump performance. Fourth, allowing the can 56 to expand against and conform to the motor laminations 90 provides for a more efficient transfer of heat from the motor stator to the fluid for purposes of motor cooling.

As shown in FIG. 8, during pump operation pressurized fluid supplied by the pump head 22 passes along that portion of the motor air gap 88 separating the motor rotor 42 and the stator barrier can 56. Pressurized fluid flow continues, as indicated by flow arrows 100, through motor bearing passages 102a, 102b into aft fluid chamber 104 and returning to a discharge plenum chamber 106 in the pump head 22 by way of the hollow rotor shaft 44. The discharge plenum chamber 106 communicates directly with a high pressure outlet 111. Circulation of fluid through the pump 10 in this manner functions to remove heat from the motor 14 during operation. It also circulates fluid to the motor bearing 52 to keep it cool and clean.

Figure 11:
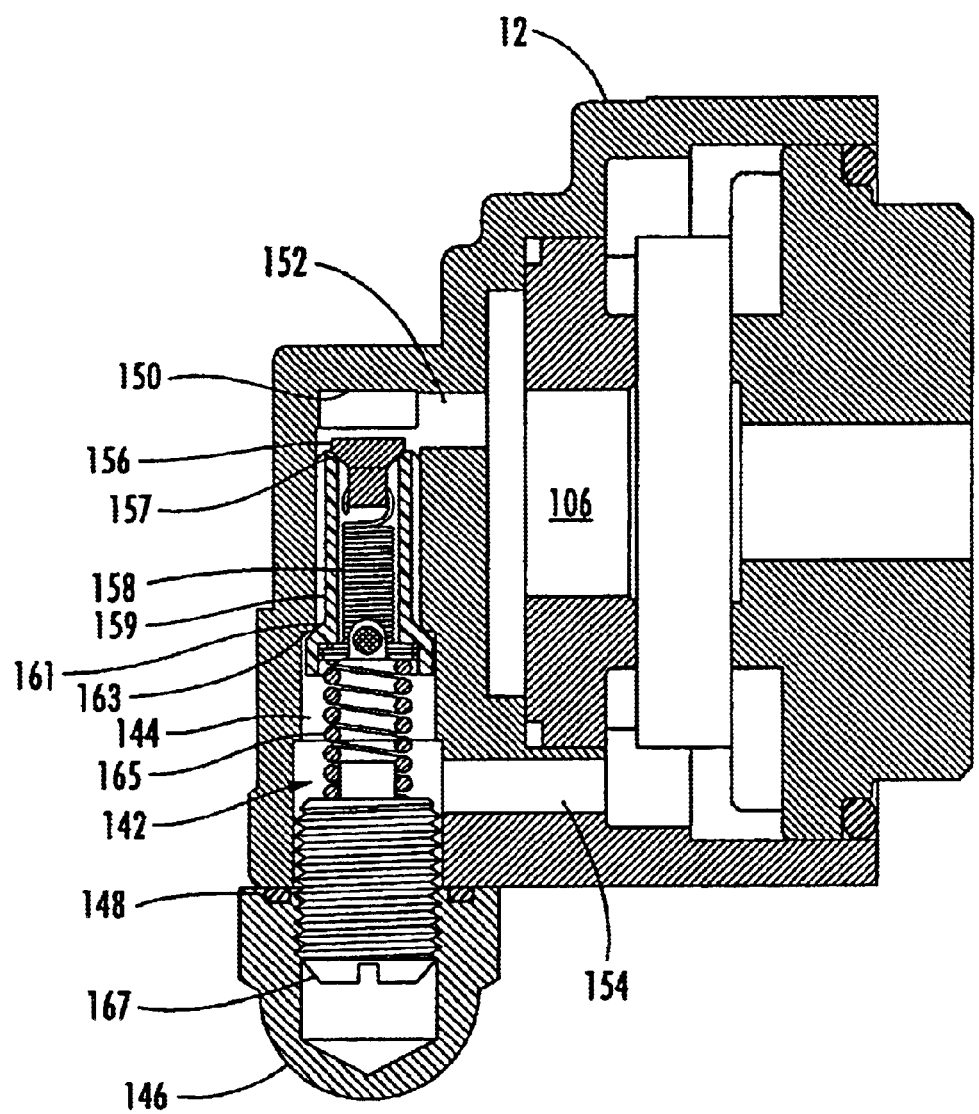
FIG. 11 is a cross-section view of a pump head according to the invention showing the pressure relief valve.

Typical vane pumps employ a pressure relief valve positioned in or near the low pressure inlet to prevent overpressure conditions from damaging the pump. Such a relief valve configuration tends to undesirably impede the flow of fluid into the pump. As shown in FIG. 11, the present invention eliminates the difficulties associated with known relief valve configurations by moving the pressure relief valve 142 away from the low pressure inlet 20 and high pressure outlet 111 and allowing the high and low pressure regions of the pump 10 to communicate with each other through the relief valve 142. This is accomplished by providing a relief valve cavity 144 in the pump head housing 12. Adjacent upper end 150 of the relief valve cavity 144 is an upper relief valve cavity passage 152 in fluid communication with the high pressure discharge plenum chamber 106. A lower relief valve cavity passage 154 is in fluid communication with the low pressure intake plenum chamber 70. A removable cap 146 provides external access to the relief valve cavity 144, and a cap O-ring 148 provides a fluid seal between the cap 146 and pump head housing 12.

The relief valve 142 includes a poppet 156 held against a seat 157 by poppet spring 158 within an upper flow tube 159. The flow tube 159 includes an annular seat 161 which is positioned against shoulder 163 to form a seal. Flow tube spring 165 acts to force the seat 161 against the shoulder 163 as shown. The force applied by spring 165 is adjustable by a threaded connector 167 which also functions to secure the relief valve 142 within its cavity 144. Travel of the poppet 156 is limited by the upper end 150 in such a way as to prevent the poppet 156 from being pulled into the discharge passage 152 in the event the poppet 156 moves toward chamber 106.

The relief valve 142 is configured to allow flow through the relief valve cavity 144 in either direction. In high pressure bypass mode when fluid pressures exerted on the valve poppet 156 and flow tube 159 are sufficient to overcome the force of spring 165, the upper flow tube 159 moves downwardly from its seated/closed position with high pressure fluid entering the cavity 144 through passage 152 and exiting through passage 154. In low pressure bypass mode when fluid pressures exerted on the valve poppet 156 are sufficient to overcome the force of spring 158, low pressure fluid in the low pressure intake plenum chamber 70 enters the relief valve cavity 144 through passage 154, moves the poppet 156 upwardly away from its seat 157, and exits the cavity 144 through passage 152.

Typical pump motor combinations use a pump head and a separate motor. In extreme thermal loading conditions within the pump head, the pump head will overheat. While most motors include a thermal sensor/switch to shut down the motor when the motor overheats, overheat conditions within the pump head are not detected by the motor sensor. As a result, the motor will continue driving the overheated pump head until catastrophic failure occurs.

In accordance with one aspect of the present invention, the motor overheat sensor/switch is reconfigured in such a way as to sense overheat conditions within the pump head 22 as well as the motor 14. In a preferred embodiment, this is accomplished by positioning an overheat sensor switch 130 within the motor stator windings 91 in an area adjacent the pump head 22. Preferably, the overheat sensor/switch 130 is of a bi-metal type and integral with the stator windings 91 so as to open the circuit of the stator windings 91 and prevent motor operation when a threshold overheat temperature, preferably about 320 degrees F., is sensed. When the overheat condition is no longer present, the bi-metal switch closes and pump operation may resume. (In an alternate switch embodiment, the bi-metal switch must be manually reset before the pump resumes operation.) The bi-metal switch 130 includes a closed position providing electrical continuity through the stator windings 91 during normal operation of the motor 14, and an open position preventing electrical continuity through the stator windings 91 when an overheat condition is sensed by the bi-metal switch 130.

It will be understood that other configurations of the sensor/switch 130 may be employed in the practice of the invention. For example, instead of an integral sensor/switch, a temperature sensor may be positioned adjacent the pump head 22 in the motor windings 91 or in some other location where the sensor can sense the temperature of the pump head 22 as well as the motor 14. The output of the temperature sensor is provided to a processor or relay which activates a switch to prevent motor operation when a threshold temperature is sensed. Thus, the present invention contemplates a single sensing device that can sense the presence of an overheat condition in either the pump head 22 or motor 14 so that action can be taken to shut down or otherwise prevent operation of the pump 10 when an overheat condition is present in the pump 10. This helps prevent damage to the pump 10 in dry running conditions as well as severe overload conditions.

It will be appreciated that while prior art pumps ineffeciently feed high pressure fluid through the motor and then discharge the high pressure fluid to a low pressure region of the pump (typically the inlet), the pump 10 of FIG. 8 does not suffer such a disadvantage. Instead, the pump 10 of FIG. 8 connects the pumping zones 82a, 82b of both pumping chambers 76a, 76b by splitting the flow and providing what is essentially two discrete paths of flow within the pump 10 with both portions of the flow recombining in the same discharge plenum chamber 106. One discrete flow path is from the pumping zones 82a, 82b, through front bearing discharge passages 85a, 85b, and into the discharge plenum chamber 106. The other discrete flow path is from the pumping zones 82a, 82b, through rear bearing discharge passages 84a, 84b, into that portion of the motor air gap 88 separating the motor rotor 42 and the stator barrier can 56, through motor bearing passages 102a, 102b into aft fluid chamber 104, through the hollow rotor shaft 44, and into the discharge plenum chamber 106.

In operation, flow is discharged though the pump from both sides of the pump rotor 28 through discharge passages 84a, 84b, 85a, 85b. The initial pressures in discharge passages 84a, 84b, 85a, 85b are equal, which balances the thrust loading of the pump rotor 28. Also, the discharge plenum chamber 106 is able to communicate to both sides of the pump rotor 28 through vane slot passages 108 formed when vanes 40 slide outwardly into a pumping chamber 76a and 76b. This allows further thrust balancing by supplying both sides of the pump rotor 28 with fluid pressure equal to that found in chamber 106. The flow path from discharge passages 85a, 85b to chamber 106 is much shorter than from discharge passages 84a, 84b to chamber 104. As fluid passes from chamber 107 to chambers 109 and 104, there is a pressure differential created by the additional distance and restricted flow area formed by the motor rotor 42 and the barrier can 56 as illustrated by fluid flow arrows 100. This tends to create a slight thrust load on the pump head side of the motor rotor 42, which tends to move the motor rotor 42 away from the pump rotor 28. In addition, the motor stator laminations 90 and rotor laminations tend to align on the electrical center of the motor during operation causing further movement between the two rotors. Manufacturing tolerances and process variations create further movement of the relative position of both rotors. These relative movements between the two rotors require additional torque from the motor as the two rotors thrust against their respective thrusting surfaces. To reduce this tendency, the motor rotor 42 and pump rotor 28 are connected by a sliding keyed end joint 46 to allow free axial movement of the two parts which minimizes parasitic loads in the system.

Figure 10:
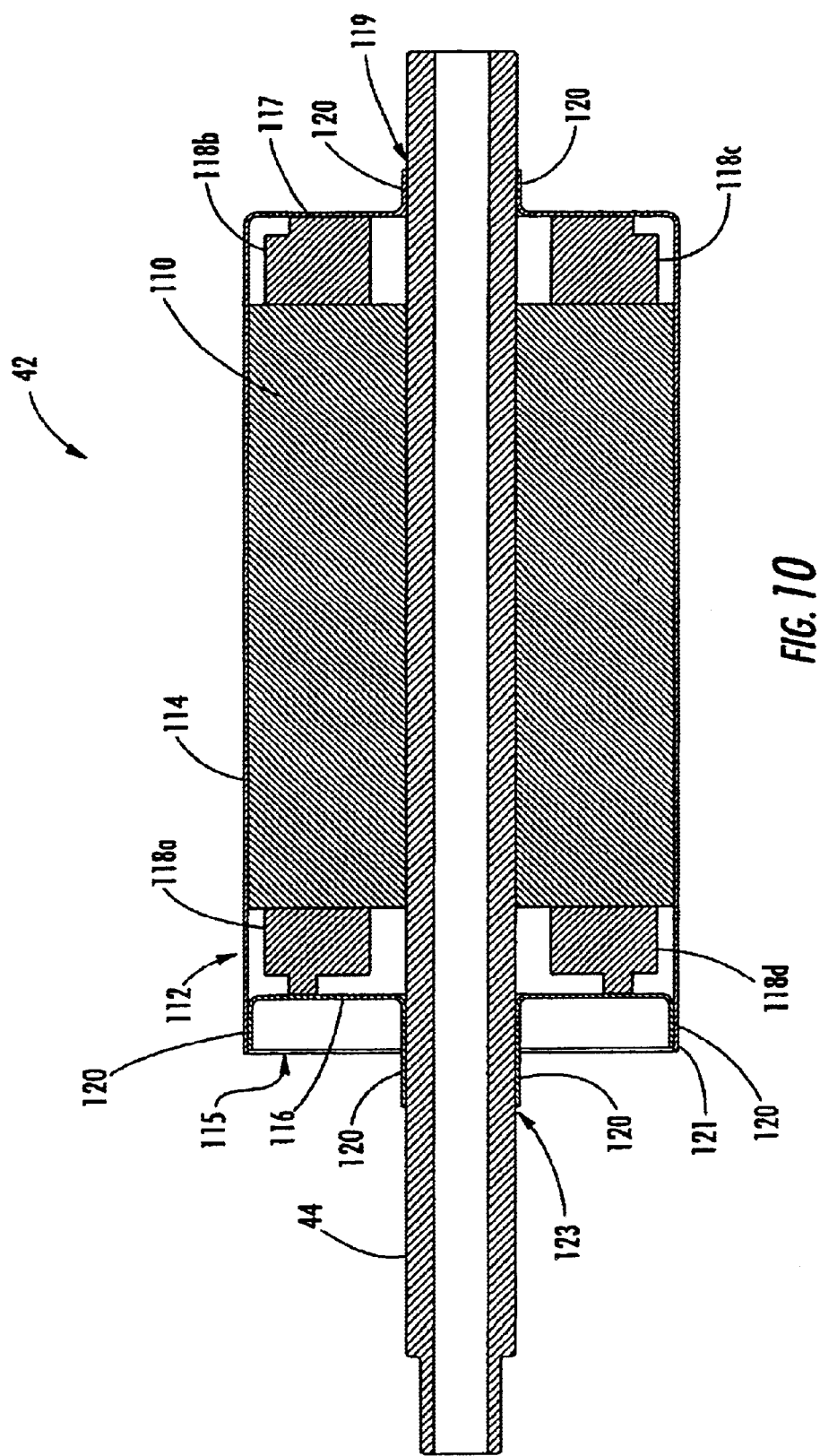
FIG. 10 is a cross-section view of a canned rotor with hollow shaft according to the invention.

The motor rotor 42, as shown in greater detail in FIG. 10, includes the hollow shaft 44 onto which the rotor laminations 110 are attached. The rotor laminations 110 are sealed from and protected against the pumped fluid by a thin rotor barrier can 112. The can 112 includes a cover portion 114 and a cap 116. Spacers 118a–d interconnect the laminations 110 and can 112 to provide added structural support. The can 112 may be assembled to the shaft 44 as by applying a positive mechanical attachment method (such as a weld, pressure fit, or adhesive) at points 120.

Since the shaft 44 is hollow, it has the potential for greater deflection during operation. Electric motors exhibit a characteristic commonly referred to as "side pull" which results in the bending or movement of the rotor 42 during startup. Bending of the rotor 42 as a result of side pull is particularly noticeable when the running center of the rotor 42 is not coincident with the stator centerline as a result of manufacturing imperfections. Application of the rotor barrier can 112 to the rotor 42, in combination with positive mechanical attachments 120, provides additional stiffness which significantly improves the overall bending resistance of the rotor 42. For example, a 0.5 inch diameter shaft has a polar moment of inertia of about 0.00306 (in$^4$). The addition of a 0.25 inch diameter hole through the shaft 44 reduces the polar moment of inertia by about 6% to 0.00287 (in$^4$). The addition of a rotor barrier can 112 with a 0.014 inch wall thickness increases the moment of inertia to a value of 0.597 (in$^4$) even with the hollow shaft 44. This is an increase of nearly 15 times the original shaft stiffness. This has been observed to effectively reduce rotor deflection, during startup, by about the same ratio.

As discussed above, fluid flow through the pump 10 can cause slight pressure differentials within the pump 10. Such pressure differentials will be experienced in the forward and rearward motor chambers 107, 109. Both ends of the motor rotor 42 are subjected to pressures within the respective chambers 107, 109. This causes a thrust load that reduces the load applied to the pump rotor 28 and the motor bearing 52 when the pump 10 is mounted in a vertical position with the pump head below the motor.

Figure 12:
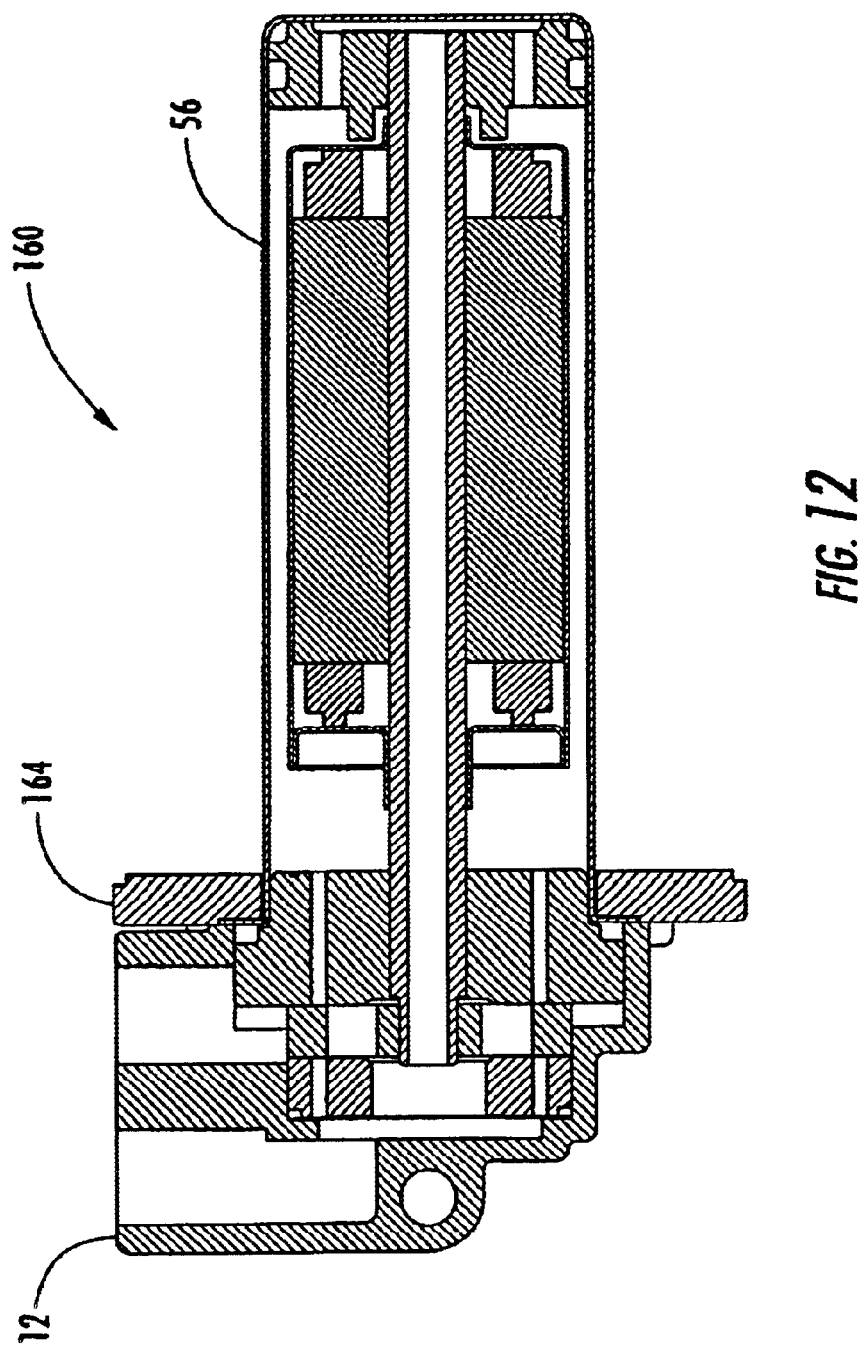
FIG. 12 is a cross-section view of a pump head subassembly according to the invention with the air gap clearance between the stator and rotor barrier cans slightly exaggerated for purposes of clarity.

The pump 10 enables the stator barrier can 56 to be assembled to the entire pump head 22 and motor rotor 42 by clamping the assembly 160 together with the front motor end shield 64 as shown in FIG. 12. The assembly 160 can be tested individually and treated for use in food applications without having to be fully assembled to the motor 14. This is also beneficial from a logistics standpoint because it allows for the production of pump head assemblies 160 ahead of schedule and the assemblies 160 can be stocked without committing to a particular motor type. It also allows for greater flexibility in the assembly methods employed, and it helps to reduce inventory and more easily meet customer demands.

Figure 13:
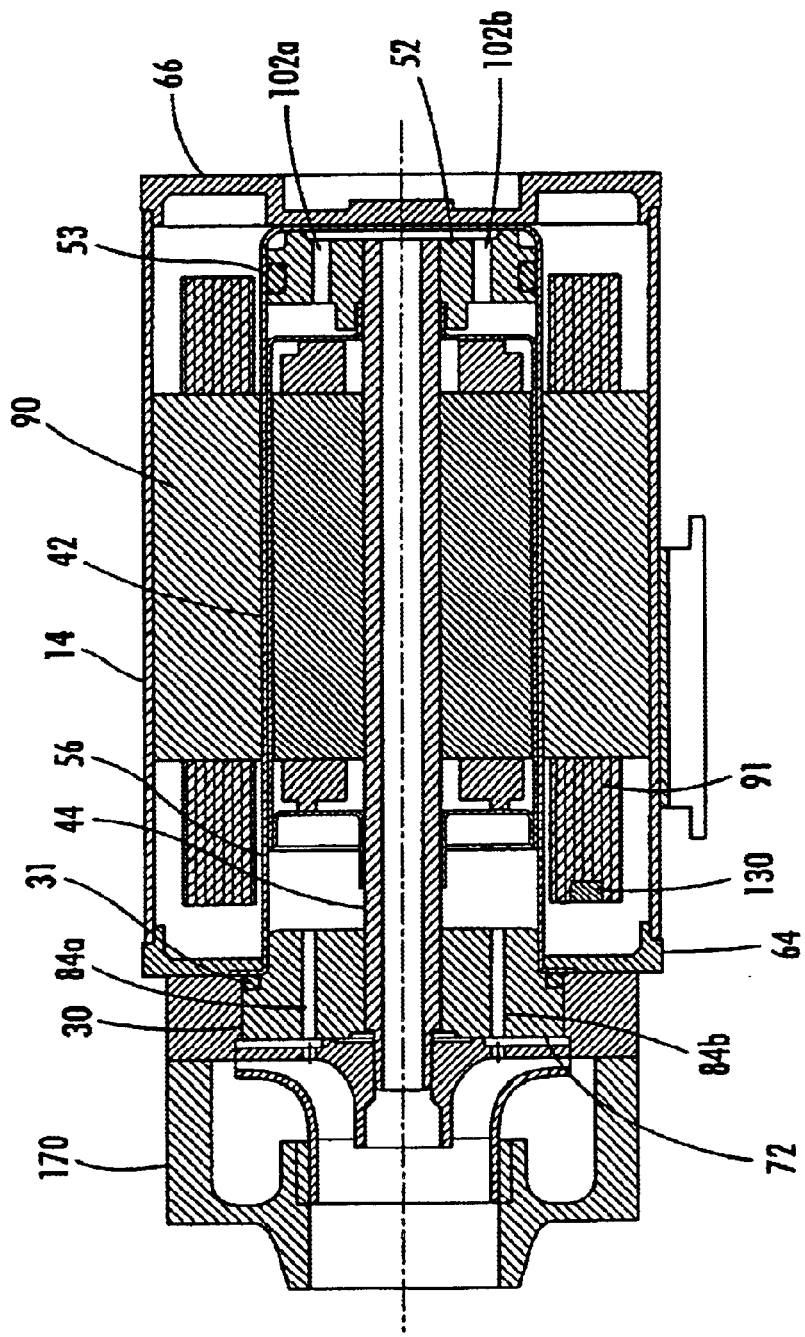
FIG. 13 is a cross-section view of a canned motor pump with a closed shroud centrifugal pump head according to the invention.
Figure 14:
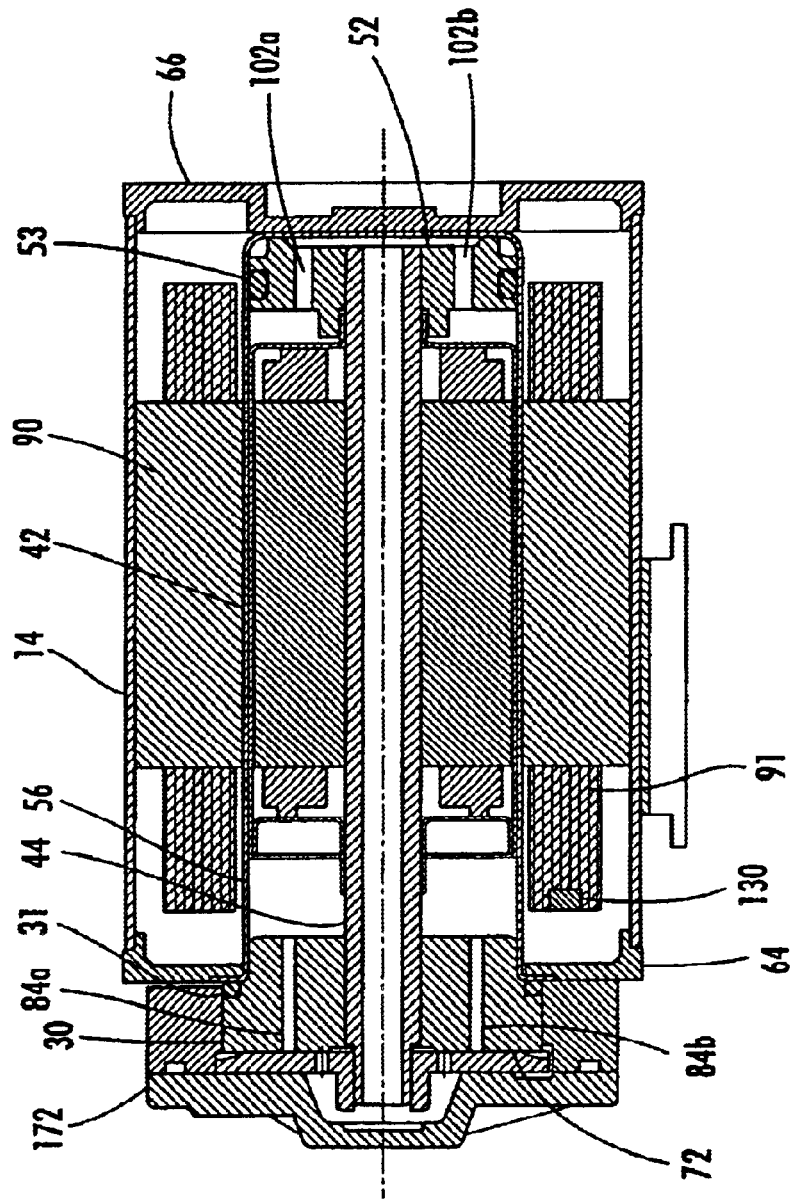
FIG. 14 is a cross-section view of a canned motor pump with a turbine pump head according to the invention.

It will be appreciated that a canned motor pump of the above described configuration is not limited to a rotary vane pump head. FIGS. 13 and 14 illustrate two alternate types of pump heads that may be employed in place of a rotary vane pump head. FIG. 13 shows a closed shroud centrifugal pump head 170 driven by the motor 14, and FIG. 14 shows a turbine pump head 172 driven by the motor 14. Flow of fluid out of the pump heads 170, 172 through bearing discharge passages 84a, 84b, between the stator barrier can 56 and canned rotor 42, through motor bearing passages 102a, 102b, and returning to the pump heads 170, 172 by way of a hollow motor shaft 44 is the same as that described above with reference to a rotary vane pump head.

The foregoing description details one or more preferred embodiments of the present invention and describes the best mode contemplated. It will be appreciated, however, that no matter how detailed the foregoing description appears, the invention can be practiced in many ways without departing from the spirit of the invention. Therefore, the above mentioned description is to be considered exemplary rather than limiting.

What is claimed is:

1. An apparatus for protecting a fluid pump motor, the apparatus comprising:
    an electric motor for driving a pump head to pressurize a fluid, the electric motor comprising:
    a stator with one or more magnetic field producing elements for producing a magnetic field in response to a flow of electrical current through the one or more magnetic field producing elements;
    a rotor having a rotor shaft for driving the pump head in response to the magnetic field produced by the stator;
    an air gap between the stator and the rotor, wherein at least a portion of the pressurized fluid from the pump head substantially continuously flows through the motor during operation; and
    a liner positioned in said air gap to inhibit pressurized fluid which enters the air gap from contacting the one or more magnetic field producing elements of the stator, said liner including a thin liner wall that deforms during operation of the apparatus to bear against said one or more magnetic field producing elements for structural support as a result of loading imparted by the pressurized fluid on the liner wall.

2. The apparatus of claim 1 wherein said electric motor further includes an end cap for closing one end of the electric motor, said liner wall including a portion that deforms to bear against said end cap for structural support as a result of loading imparted by the pressurized fluid on the liner wall.

3. The apparatus of claim 1 wherein said liner includes:
    an open end;
    a closed end in opposed relation to said open end; and
    an annular flange adjacent said open end.

4. The apparatus of claim 3 wherein said liner is of substantially uniform cross-sectional dimension between its open and closed ends.

5. The apparatus of claim 3 wherein said liner is fabricated as a single metal part using a deep drawing process.

6. The apparatus of claim 1 wherein said rotor shaft is hollow and configured to receive pressurized fluid.

7. The apparatus of claim 1 wherein said rotor includes a rotor barrier can to prevent pressurized fluid entering the air gap from contacting the rotor laminations.

8. The apparatus of claim 1 wherein said pump head is a rotary vane pump head.

9. The apparatus of claim 1 wherein said pump head is a turbine pump head.

10. The apparatus of claim 1 wherein said pump head is a centrifugal pump head.

11. An apparatus for protecting a fluid pump motor, the apparatus comprising: an electric motor for driving a pump head to pressurize a fluid, the electric motor comprising:
    a stator with one or more magnetic field producing elements for producing a magnetic field in response to a flow of electrical current through the one or more magnetic field producing elements;
    a rotor having a rotor shaft for driving the pump head in response to the magnetic field produced by the stator;
    an air gap between the stator and the rotor, wherein at least a portion of the pressurized fluid from the pump head is circulated through the motor; and
    a liner positioned in said air gap to inhibit pressurized fluid which enters the air gap from contacting the one or more magnetic field producing elements of the stator, said liner including:
    an open end;
    a closed end in opposed relation to said open end and having a closed end wall;
    a liner body having a liner body wall with a length defined by the distance between the open and closed ends of the liner; and
    an annular flange adjacent said open end, said liner being attached to the electric motor only at the annular flange.

12. The apparatus of claim 11 wherein the liner body wall along at least a portion of said liner body is sufficiently thin that it deforms to bear against said one or more magnetic field producing elements for structural support as a result of loading imparted by the pressurized fluid on the liner body wall.

13. The apparatus of claim 12 wherein said electric motor further includes an end cap for closing one end of the electric motor, said closed end wall along at least a portion of the closed end being sufficiently thin that it deforms during operation of the apparatus to bear against said end cap for structural support as a result of loading imparted by the pressurized fluid on the closed end wall.

14. The apparatus of claim 11 wherein said liner body is of substantially uniform cross-sectional dimension throughout its length.

15. The apparatus of claim 11 wherein said liner is fabricated as a single metal part using a deep drawing process.

16. The apparatus of claim 11 wherein said rotor shaft is hollow and configured to receive pressurized fluid.

17. The apparatus of claim 11 wherein said rotor includes a rotor barrier can to prevent pressurized fluid entering the air gap from contacting the rotor laminations.

18. The apparatus of claim 11 wherein said pump head is a rotary vane pump head.

19. The apparatus of claim 11 wherein said pump head is a turbine pump head.

20. The apparatus of claim 11 wherein said pump head is a centrifugal pump head.

21. A motor pump comprising:
    a pump head for receiving a fluid at a first pressure and outputting the fluid at a second pressure that is greater than said first pressure; and
    an electric motor positioned adjacent said pump head for driving the pump head to pressurize the fluid, said motor comprising:
    a stator with one or more magnetic field producing elements for producing a magnetic field in response to a flow of electrical current through the one or more magnetic field producing elements;

a rotor having:

a rotor barrier can to prevent pressurized fluid entering the air gap from contacting the rotor laminations; and a hollow rotor shaft for driving the pump head in response to the magnetic field produced by the stator;

an air gap between the stator and the rotor, wherein at least a portion of the pressurized fluid output by the pump head is circulated through the motor along a circulation path that includes the motor air gap and the hollow rotor shaft; and a liner positioned in said air gap to inhibit pressurized fluid which enters the air gap from contacting the one or more magnetic field producing elements of the stator, said liner including:

an open end;

a closed end in opposed relation to said open end; and a liner body having a liner body wall with a length defined by the distance between the open and closed ends of the liner, wherein the liner body wall along at least a portion of said liner body is sufficiently thin that it deforms during operation of the apparatus to bear against said one or more magnetic field producing elements for structural support as a result of loading imparted by the pressurized fluid on the liner body wall.

22. The apparatus of claim 21 wherein said liner body is of substantially uniform cross-sectional dimension throughout its length.

* * * * *